C. I. E. MASTIN.
GASKET.
APPLICATION FILED JUNE 1, 1909.

935,387.

Patented Sept. 28, 1909.

Witnesses
M. L. Pugh.
C. J. Williamson

Inventor
Charles I. E. Mastin,
By Chas. N. Fowler
Attorney

UNITED STATES PATENT OFFICE.

CHARLES I. E. MASTIN, OF PATERSON, NEW JERSEY.

GASKET.

935,387.  Specification of Letters Patent.  Patented Sept. 28, 1909.

Application filed June 1, 1909.  Serial No. 499,557.

*To all whom it may concern:*

Be it known that I, CHARLES I. E. MASTIN, a citizen of the United States, residing at Paterson, in the county of Passaic and State of New Jersey, have invented certain new and useful Improvements in Gaskets, and do hereby declare that the following is a full, clear, and exact description of the same, reference being had to the annexed drawings, making a part of this specification, and to the letters of reference marked thereon.

The object of my invention is to provide a gasket that while possessing the characteristics of flexibility and elasticity, will have great strength and durability, even when exposed to excessive heat, such as that of boiling water and superheated steam, or to acid or oil, and to this end my invention consists in the gasket constructed substantially as hereinafter specified and claimed.

Figure 1:
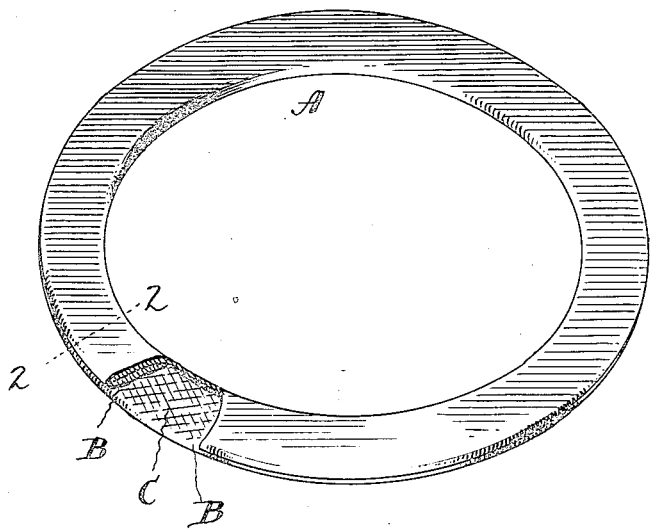
Figure 2:
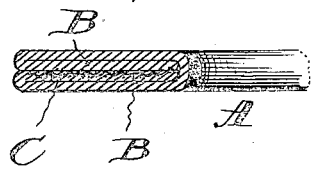

Referring to the accompanying drawings, Figure 1 is a perspective view of a gasket embodying my invention; Fig. 2 a cross section on the line 2—2 of Fig. 1.

In constructing my gasket A, I use rubber and asbestos, the rubber preferably being Pará gum, and the asbestos long fibered, and the stock being thoroughly cured. In cross section, my gasket has four laps or thicknesses, which is secured by first lapping the edge portions B of the stock toward each other until they meet, or nearly meet, at their edges, and then folding or doubling contiguous to such edges with the first mentioned laps or folds on the inside, or against each other. The inner edge of the ring or gasket is thus a continuous surface, while a joint or division line appears at the outer edge of the gasket. In cases where extra strength is required, a filling C of woven bronze or other wire is employed, although for ordinary purposes the gasket is strong enough without the insertion of the wire.

By reason of the double folds, or the mode of folding, a body of material is provided that assures a tight joint, and yet the gasket has all required resilience and flexibility.

Experience has shown that the same gasket may be repeatedly used to pack the same joint. It will be observed that the free edges of the laps or folds B are completely inclosed and protected.

In making my gasket, the rubber and long-fibered asbestos are thoroughly mixed, and after the gasket is made it is heated to thoroughly cure or vulcanize the rubber. My gasket is thus able to stand subjection to severe heat, and will not adhere to metal surfaces. When reinforced with a layer of wire cloth, the latter by the vulcanizing process becomes a part of the structure, so that it cannot be separated therefrom. If a greater number of folds or plies than four plies is desired, a gasket embodying my invention can be thus made. Of course, more than one layer or ply of wire cloth may be used.

What I claim is—

1. A gasket composed of an integral piece having rubber in its composition and having several flat laps or folds lying in contact, the free edges of the piece being turned inward and covered by a lap or fold forming one of the edges of the gasket, said free edges being thereby completely inclosed.

2. A gasket having in cross section four thicknesses composed of an integral piece folded at the inner and outer edges of the gasket.

3. A gasket having in cross section four thicknesses composed of an integral piece folded at the inner and outer edges of the gasket, the free edges of the lapped or folded portions being innermost.

4. A gasket having in cross section inwardly turned laps or folds having a ply of wire cloth.

In testimony whereof I affix my signature in presence of two witnesses.

CHARLES I. E. MASTIN.

Witnesses:
RAYTON E. HORTON,
ALBERT C. NIGHTINGALE.